United States Patent
Weber

(10) Patent No.: US 8,689,663 B2
(45) Date of Patent: Apr. 8, 2014

(54) BICYCLE PEDAL WITH INCREASED THEFT PROTECTION

(76) Inventor: Geoffrey Paul Weber, Woodbridge, VA (US)

( * ) Notice: Subject to any disclaimer, the term of this patent is extended or adjusted under 35 U.S.C. 154(b) by 415 days.

(21) Appl. No.: 12/699,856

(22) Filed: Feb. 3, 2010

(65) Prior Publication Data

US 2011/0283828 A1 Nov. 24, 2011

(51) Int. Cl.
*B62M 3/16* (2006.01)
(52) U.S. Cl.
USPC .......................................... 74/594.4; 74/594.1
(58) Field of Classification Search
USPC ................... 74/594.1–594.7; 403/315–320; 180/287, 285; D12/125
See application file for complete search history.

(56) References Cited

U.S. PATENT DOCUMENTS

| | | | | |
|---|---|---|---|---|
| 601,710 | A * | 4/1898 | Fay | 74/594.2 |
| 609,127 | A * | 8/1898 | Stearns | 70/236 |
| 626,630 | A * | 6/1899 | Peerstone | 403/287 |
| 686,940 | A * | 11/1901 | Huscher | 70/236 |
| 704,655 | A * | 7/1902 | Morgan | 70/236 |
| 947,073 | A * | 1/1910 | Conta | 70/236 |
| 1,140,751 | A * | 5/1915 | Leksuczin | 70/299 |
| 2,536,466 | A * | 1/1951 | Rippenbein | 74/594.7 |
| 4,417,745 | A * | 11/1983 | Shomo | 280/287 |
| 4,446,753 | A * | 5/1984 | Nagano | 74/594.1 |
| 4,651,590 | A * | 3/1987 | Thun | 74/594.1 |
| 4,841,757 | A * | 6/1989 | Guthrie | 70/236 |
| 4,842,292 | A * | 6/1989 | Wang | 280/287 |
| 4,915,374 | A * | 4/1990 | Watkins | 482/57 |
| 5,243,879 | A * | 9/1993 | Nagano | 74/594.2 |
| 5,315,896 | A | 5/1994 | Stringer | |
| 5,440,950 | A * | 8/1995 | Tranvoiz | 74/594.4 |
| 5,458,022 | A * | 10/1995 | Mattfeld et al. | 74/594.1 |
| 5,586,472 | A | 12/1996 | Lin | |
| 5,899,813 | A * | 5/1999 | Bunce | 464/99 |
| 5,934,155 | A * | 8/1999 | Lai | 74/594.1 |
| 6,568,296 | B1 * | 5/2003 | Lin | 74/594.1 |
| 6,585,444 | B1 * | 7/2003 | Podbutzky | 403/322.1 |
| 6,637,292 | B2 * | 10/2003 | Chu | 74/594.7 |
| 6,708,998 | B1 * | 3/2004 | Blake | 280/259 |
| 6,874,387 | B2 | 4/2005 | Vaughn | |
| D507,512 | S * | 7/2005 | Cantley | D12/125 |
| 7,017,444 | B2 * | 3/2006 | Kim | 74/594.3 |
| D524,195 | S * | 7/2006 | Neal | D12/125 |
| 7,226,394 | B2 * | 6/2007 | Johnson | 482/57 |
| 7,240,907 | B2 * | 7/2007 | Chen | 280/7.1 |
| 7,624,605 | B2 | 12/2009 | Vitali | |
| 7,798,513 | B1 * | 9/2010 | Salvant | 280/304.3 |
| 8,448,971 | B2 | 5/2013 | Giroux | |
| 2002/0074768 | A1 * | 6/2002 | Huret | 280/261 |
| 2004/0037628 | A1 * | 2/2004 | Meggiolan | 403/258 |
| 2007/0012076 | A1 * | 1/2007 | Bleijendaal | 70/233 |
| 2007/0052197 | A1 * | 3/2007 | Chen | 280/259 |
| 2010/0098484 | A1 * | 4/2010 | Chen | 403/321 |

* cited by examiner

*Primary Examiner* — Troy Chambers
*Assistant Examiner* — Valentin Craciun

(57) ABSTRACT

An anti-theft bicycle pedal is disclosed. The mounting end of the pedal is shaped with polygonal faces and/or splines to match an opening on the crank so that when the mounting end of the pedal axle is inserted into the matching opening and locked into place, the pedal cannot be removed without an unlocking agent. With an unlocking agent, the pedal is easily removed without tools. The pedal can be reversibly mounted on the crank so that the bicycle cannot be pedaled away, or so that the pedal can be stowed during transport or storage. The pedal cannot rotate in the crank as a result of polygonal faces and/or splines on the mounting end that resist rotation. A physical stop can be used to control the symmetry of insertion into the opening which facilitates reversible mounting.

14 Claims, 6 Drawing Sheets

Fig. 3
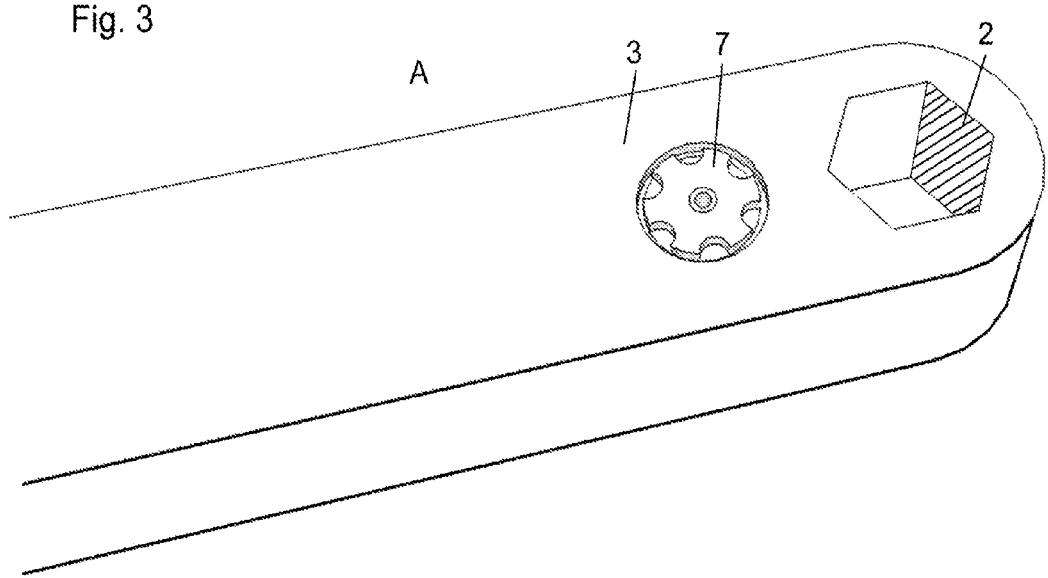
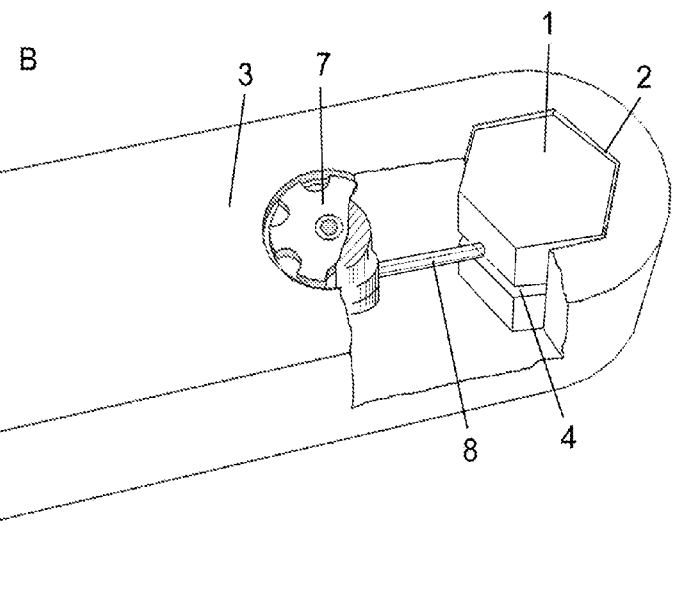

BICYCLE PEDAL WITH INCREASED THEFT PROTECTION

FIELD OF THE INVENTION

The present invention relates to a detachable bicycle pedal which permits the pedal to be quickly and easily removed from or attached to the crank in a reversible manner. The pedal is removed or attached manually by a locking means.

BACKGROUND OF THE INVENTION

Nearly 100% of bicycle pedals are attached to the crank by means of threading on the mounting end of the pedal axle which mates with a threaded hole at the outboard end of the crank. The threads are right and left handed so as to tighten in the forward pedaling direction. This pedal mounting method does not permit the user to quickly and easily remove the pedal from the crank. Thus, bicycle pedals currently are screwed directly to the crank and require a tool to install and remove the pedal.

The rise in interest in bicycles among recreation enthusiasts and commuters has paralleled increased interest in the health and fitness as well as the need to cut commuting expenses. With this increased interest in bicycling there has been a matching increase in bicycle and bicycle parts theft. There is a need for improved bicycle and bicycle parts security especially among owners of more expensive bicycles. For example, bicycle pedals have become expensive with recent interest in custom designed racing pedals and these pedals need convenient protection from theft.

When bicycles are stacked, stored and transported, protruding pedals often entangle with other bicycle parts. The protruding pedals can scratch or deface surfaces on cars and walls during transport and storage. When bicycles are shipped in a box including during airplane flights, the pedals must be removed.

Another example of pedal protrusion problems is when a bicycle gets a flat tire while being ridden on the road and the rider must get off and walk along beside the bicycle until repair or other transport can be arranged. The bicycle pedal has a tendency to repeatedly strike the walker on the legs while walking beside the disabled bicycle. Usually the tools necessary for bicycle pedal removal are not at hand in this instance.

U.S. Pat. No. 6,874,387 relates to a quick release bicycle pedal mounting connector that uses an interchange plug connector between the pedal and the crank. The plug connector screws into the crank and an adaptor screws onto the pedal. While making the pedal easy to remove by the user, this design provides only partial solution to the security issue; the user must take the pedal with them. Further, the interchange plug connector moves the pedal further from the crank thereby changing the leg to pedal dynamic. Additionally, part of the connector still protrudes from the crank when the pedal is removed, which can still cause damage and itself is subject to damage.

U.S. Pat. No. 5,586,472 relates to a detachable bicycle pedal mounting structure that requires a specialized hexagonal pedal shaft and in making the connection a small locking piece is required for stability. Small pieces are easily lost. The adaptor still protrudes; the pedal is not reversible; the pedal is not lockable.

U.S. Pat. No. 5,440,950 relates to a detachable shaft such as a pedal shaft which again requires a special shaft and pedal combination. Also in many of the designs there are small parts required to complete the connections.

U.S. Pat. No. 5,315,896 relates to a quick release bicycle pedal which requires a hollow shaft pedal to make the connections possible. This design requires pedal retrofits to be adaptable to the crank connector.

Some of the history and discussion of pedal design can be found at Speedway Pedals: www.speedplay.com and Wikipedia: en.wikipedia.org/wiki/Bicycle_pedal. These design changes have focused on the pedal base and how the pedal base interacts with the bicyclist's shoe.

Thus, there is a need for an improved design for an easily removed bicycle pedal that simultaneously increases theft security for the bicycle and pedal and improved safety for the rider.

SUMMARY OF THE INVENTION

This invention is directed to a pedal mounting end that is reversible and easily removable. No special tools are required to remove or install the pedal. After mounting, the pedal is held into the crank by a locking means. The mounting end can be adapted to any pedal design as the instant invention is only directed to the mounting end.

In one embodiment, the mounting end of the pedal axle has a polygonal shape that aligns with a corresponding polygonal opening in the crank. For example, the polygonal shape has three, four, five, six, seven or eight flat surfaces or more, but too many flat surfaces results in rounding and decreased resistance to turning in the crank.

In another embodiment, the mounting end of the axle has spline elements that align with corresponding slots in the opening in the crank. The number and depth of the splines is limited by the space in the end of the crank.

In another embodiment, the mounting end comprises a combination of spline and polygonal elements.

In yet another embodiment, the mounting end comprises spline, and/or polygonal elements in combination with round elements.

The splines and/or polygonal surfaces provide a large contact area between the crank and the mounting end of the pedal axle for a stiff interface that resists rotation as the rider propels the pedals forward or backward.

In yet another embodiment, the extent that the mounting end is inserted into the opening is controlled by a stopping means. The stopping means facilitates maintaining the symmetrical reversibility of the mounting end.

Because the mounting end is symmetrical, the pedal can be easily reversed in the crank. Reversing the pedal in the crank provides numerous benefits. The rider can stow the pedal on the bicycle when locking it up and does not need to carry the dirty pedal away.

Other antitheft advantages are immediately apparent.

Because the reversed pedal faces the center of the bicycle, the pedal impedes crank rotation and thereby increases theft protection. On many bicycles the crank extends sufficiently that the rider can engage the reversed pedal with the wheel spokes which prevents the wheel from turning. A bicycle with the pedals reversed will not be easy to roll away, especially if the pedal can be engaged with the wheel spokes.

The reversed pedals cannot be readily used; a bicycle without usable pedals cannot be pedaled away.

Yet another advantage of reversing the pedal and locking it in place is to prevent would be thieves from installing their own pedals on the bicycle into the empty opening of the crank. This solves a major problem with the pedal of U.S. Pat. No. 6,874,387.

Another advantage of reversing the pedals in the crank is to keep the crank opening sealed and clean at all times.

An additional advantage is that there no longer are right and left pedals; either pedal can attach to either side. This is advantageous because it often happens that only one of a pair of pedals becomes damaged or defective with use. With the current thread mounted pedals, both pedals must be replaced. With the mounting end of the instant invention, only one pedal need be replaced, a clear cost savings for the bicyclist.

An additional advantage is that only the mounting end is being changed; the length and diameter of the pedal axle and the design of the pedal base remain the same. Thus, the pedal mounting end of the instant invention can be adapted to any extant pedal design without changing any of the other pedal dynamics.

The locking means will engage the mounting end of the axle and hold the pedal on the crank at all times. Because the pedal locks into the crank, only a person with the unlocking means can remove the pedal. By use of a stopping means, the extent that the mounting end inserts into the opening is easily controlled so that it is easier for the user to align the locking means with the engaging aspect of the mounting end.

BRIEF DESCRIPTION OF THE DRAWINGS

FIG. 1A shows a polygonal mounting end (1) and matching polygonal opening (2) in the crank (3). FIG. 1B shows a splined mounting end (1) and matching slotted opening (2) in the crank (3). FIG. 1C shows a symmetrical mix of spline elements (1a) and polygonal elements (1b) on the mounting end (1) and matching slot opening (2a) and polygonal opening (2b) elements on the crank (3). FIG. 1D shows a combination of round elements (1c) and polygonal elements (1a) and matching round opening (2c) and polygonal opening (2b) elements on the crank.

FIG. 3 shows a representative locking means on the crank in relation to the matching opening. FIG. 3A shows a locking means (7) up the crank (3) from the opening (2). For simplicity a circular lock is illustrated. FIG. 3B shows a cutaway view of how the locking means throws a deadbolt like extension (8) into a groove (4) of a polygonal mounting end (1) in a polygonal opening (2). For simplicity of illustration, the axle and pedal base is not depicted.

DETAILED DESCRIPTION OF THE INVENTION

Heretofore, bicycle pedals have been attached to the crank by means of a threaded connection. Threaded connections are designed to tighten as the pedal is pressured in the forward direction of pedaling. This results in a pedal that is very securely fastened and one that is not removed without the use of a tool such as a wrench designed to fit narrow flats on opposite sides of the pedal axle and application of much force.

The bicycle pedal of the instant invention is based on the design and connectivity of the mounting end of the pedal axle. The mounting end is shaped so that it plugs into a matching opening in the crank and is locked into place by a locking means. Such plug and matching opening designs are not themselves unique, however, in this application, unique solutions to several problems are provided.

As used herein, the mounting end (1) is the end of the pedal axle (5) that serves as the connector between the pedal and crank (3).

As used herein, the crank is a portion of the crank set that gives extension to the pedal from the bottom bracket. The crank set is one piece as in children's bicycles or multi-piece as in adult bicycles.

The nature of the instant invention is better understood by reference to the drawings.

Figure 1:
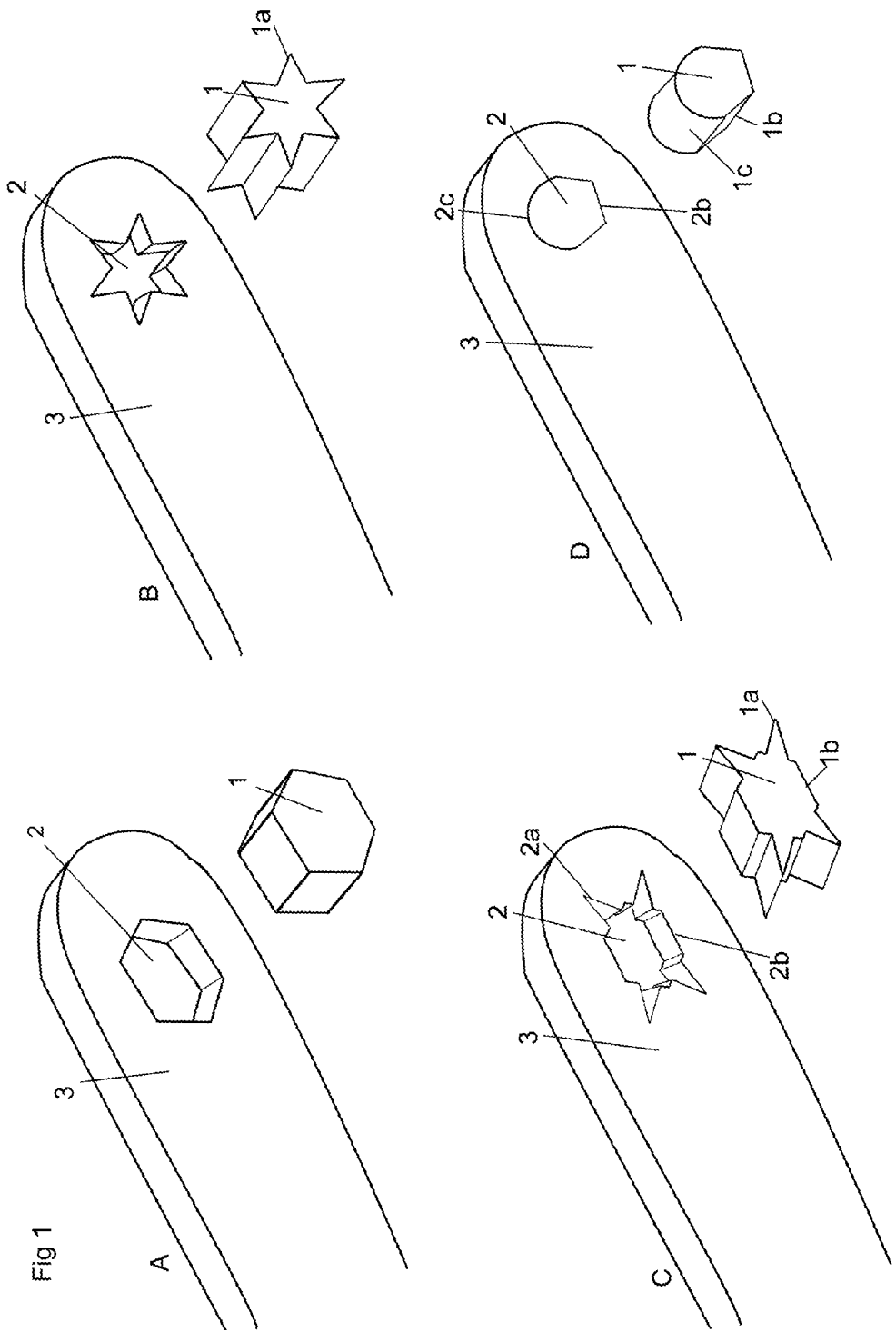
FIG. 1 provides several representative means of matching the mounting end of the pedal axle and the crank. For simplicity of illustration, the axle and pedal base is not depicted. The relative sizes of the mounting ends and pedal axis may be exaggerated for illustration.

As illustrated in FIG. 1, the mounting end (1) of the pedal axle (5) is designed to have polygonal (1b) and/or spline (1a) elements so as to resist rotation of the pedal axle as the pedal is pressured in either the forward or backward direction. Such designs are common in tool and gear designs. Their strength and resistance to rotation are well established. The splines and/or polygonal faces of the mounting end engage the corresponding surfaces of the opening to make a simple plug fitting. FIGS. 1A, 1B, 1C and 1D illustrate polygonal, spline, combined polygonal (1b) with spine (1a) elements, and combined round (1c) with polygonal elements respectively. It is contemplated that other more complicated plug and opening designs are possible, but the designs herein are well known to be strong and easy to manufacture.

In one embodiment, the mounting end (1) of the pedal axle (5) has a polygonal shape that aligns with a corresponding polygonal opening (2) in the crank (3). For example, the polygonal shape has three, four, five, six, seven or eight flat surfaces or more, but too many flat surfaces results in rounding and decreased resistance to turning in the crank.

In another embodiment, the mounting end (1) of the axle (5) has splines (1a) that align with corresponding slots (2a) in the opening (2) in the crank (3). The number and depth of the splines is limited by the space in the end of the crank.

In another embodiment, the mounting end (1) comprises a combination of spline (1a) and polygonal (1b) elements.

In yet another embodiment, the mounting end comprises spline (1a), and/or polygonal (1b) elements combined with round (1c) elements. However, round elements must be minimized to obtain maximum resistance to rotation in the crank.

Figure 2:
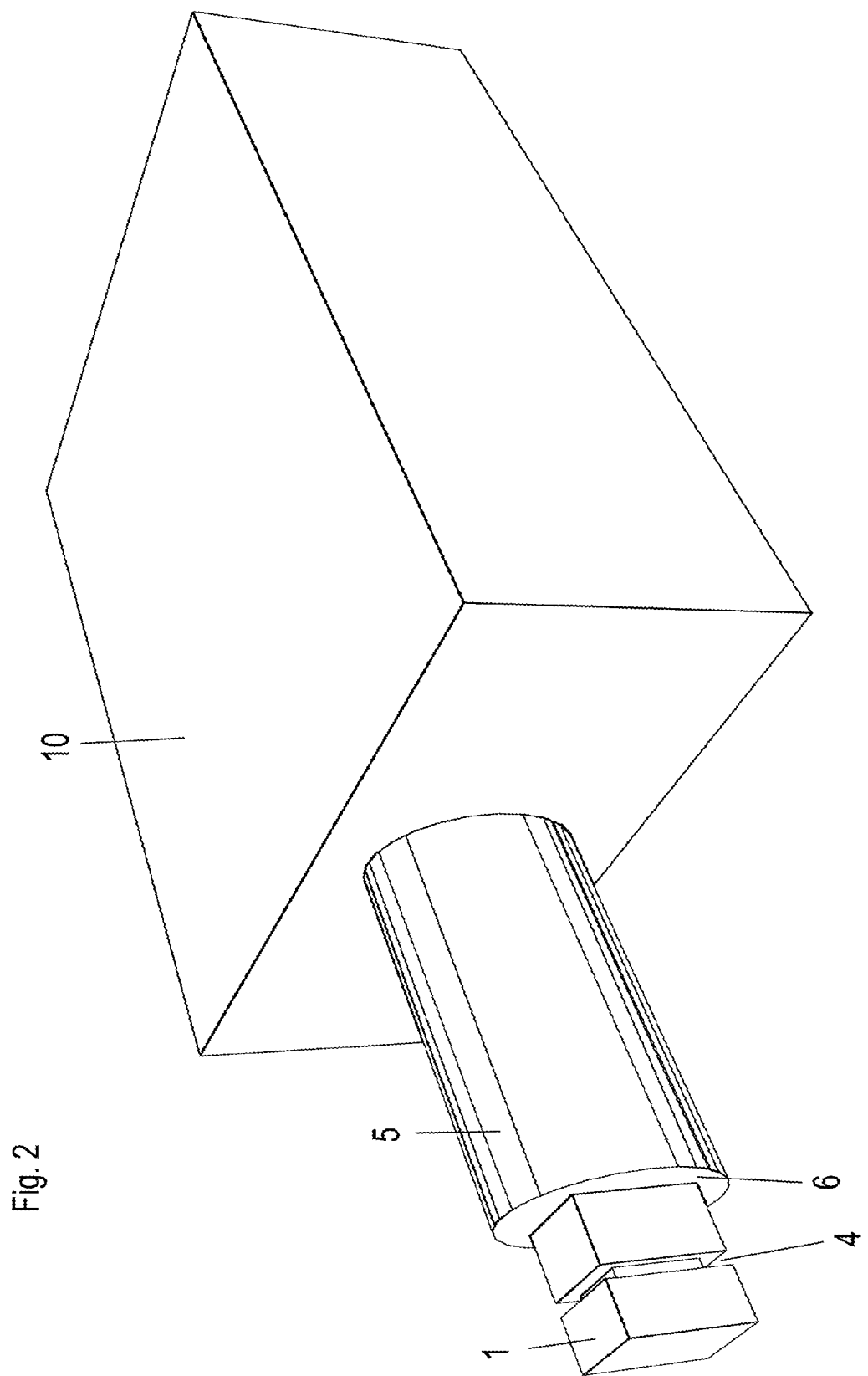
FIG. 2 shows a pedal with a polygonal mounting end (1) with a single groove (4) across the center and orthogonal to the axle axis to illustrate where a locking pin engages the mounting end of the pedal axle (5) as well as a stopping means (6). A stylized pedal base (10) is shown.

In another embodiment, the mounting end comprises a stopping means to control the depth and positioning of the mounting end in the matching opening so that reversible symmetry of the insertion is obtained and the engagement of a locking means is facilitated. A stopping means is used to control the depth of insertion of the mounting end into the matching opening. This facilitates the alignment of the locking means and the mounting end engagements. Several ways of creating a stopping means are known in the art such as, but not limited to, an annular ring, a step up in axle diameter, a pin, a spring loaded bearing that engages a groove or indent, or simply that the shapes of the mounting end come to an abrupt stop where desired such that the mating point of the mounting end with the rest of the axle is the stopping means (6) (FIG. 2).

Simply plugging the mounting end of the pedal into the opening in the crank without securing the two together is not sufficient. The mounting end must be locked into the opening for several reasons. The pedal would simply fall out of the opening without being secured. The pedal could be easily removed by thieves and stolen. The other anti-theft advantages of the instant invention would not be realized.

The typical socket wrench has a square opening with an indent within the opening that engages a spring loaded bearing of the corresponding square connector on the ratchet arm. When the bearing engages the indent the socket is held firmly but removably from the ratchet arm connector. This simple connection solution does not lock the socket onto the ratchet arm, and, indeed, locking the socket onto the ratchet arm is not normally desirable. Such a solution in the case of a bicycle pedal, while it would provide an attachment, would make it too easy for a thief to remove the pedal and simply walk away with it. Further, it is possible for the pedal to pop off the crank during strenuous use. Additionally, the other anti-theft advantages of the instant invention would not be realized.

The various advantages of the instant invention are obtained by the combination of three elements: plug and matching opening mounting, a simple locking means to secure the pedal to the crank, and the symmetry of the locking means and plug. This allows the pedal to be reversibly mounted and locked into the crank. The addition of a stopping means to control the depth of insertion of the mounting end into the crank further facilitates the ease of use. The locking engagement does not need to resist the force applied to the pedal during use; the rotational resistance comes from the splines and/or polygonal faces of the mounting end. The locking means need merely resist the pedal being prized out of the opening in the crank so that the pedal remains attached to the crank unless the locking means is disengaged.

Many different locking means may be used. A simple means is to have one or more orthogonal grooves and/or one or more indents in the mounting end. A single groove (4) as shown in FIG. 2 is engaged by a locking means (7) such as illustrated in FIG. 3B. When more than one groove and/or indent is used, they can be different depths much like a key for even more security against removal. The number and width of the grooves and/or indents is dictated by matters of strength of the mounting end and available material. The one or more grooves and/or indents must be symmetrically arranged along the axis of the mounting end (1) to maintain the reversibility of the pedal.

Because the locking means is in a small area on the crank and is limited to the width and thickness of the crank, a simple efficient locking means is needed. One non-limiting example is a circular cylinder. A circular locking means allows multiple pins to defeat picking and is quite well known in the art.

A simple way to engage the one or more groove and/or one or more indents is for the lock to engage one or more deadbolt-like pins (8) into the one or more grooves (4) and/or one or more indents thereby engaging and locking the mounting end (1) of the pedal axle (5) to the crank (3) (FIG. 3B).

In another embodiment, a locking means is installed on the outboard end of the crank, and pushed in to engage the mounting end.

Figure 4:
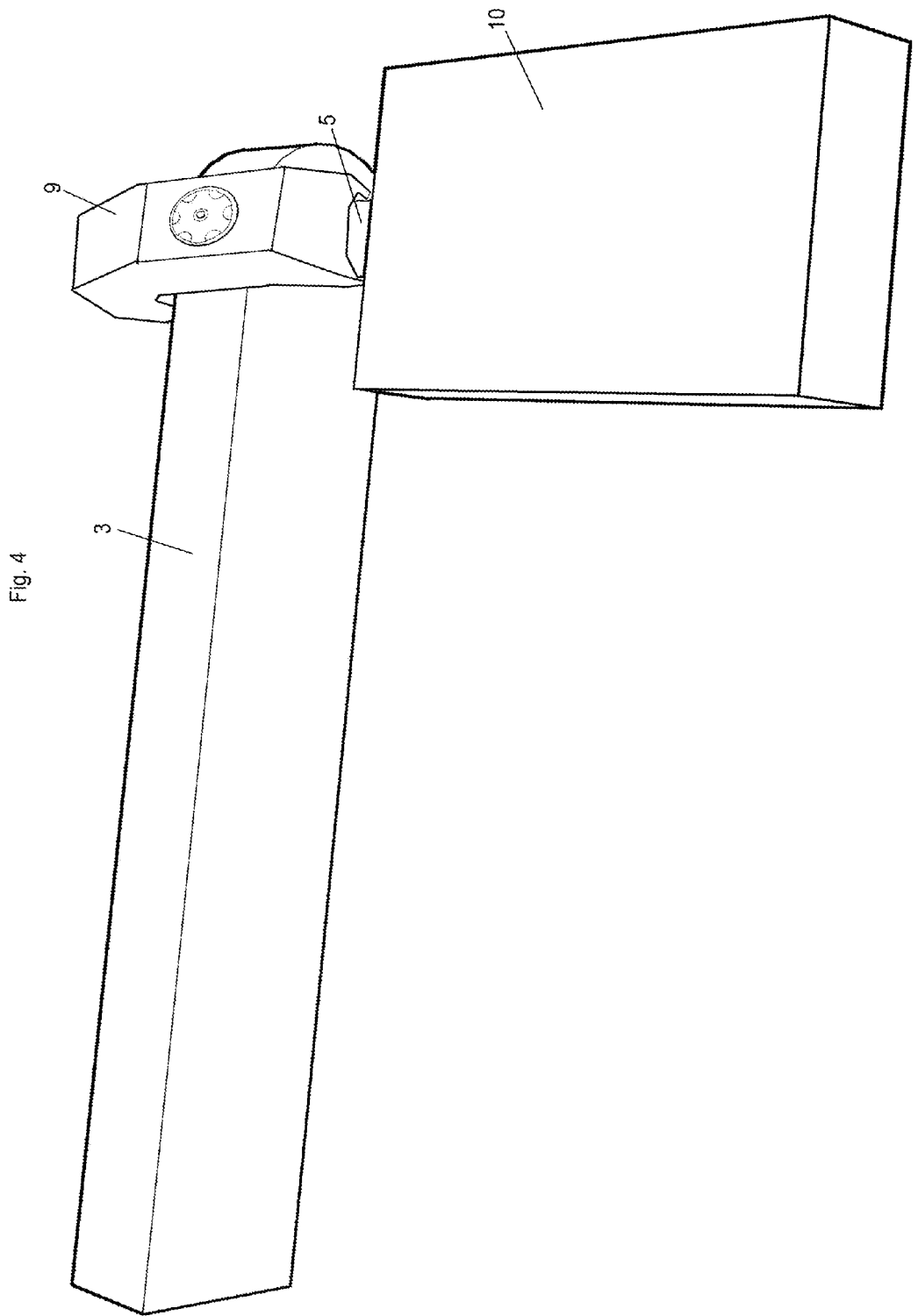
FIG. 4 shows a locking means (9) that engages the mounting end of the pedal outside the crank (3).
Figure 6:
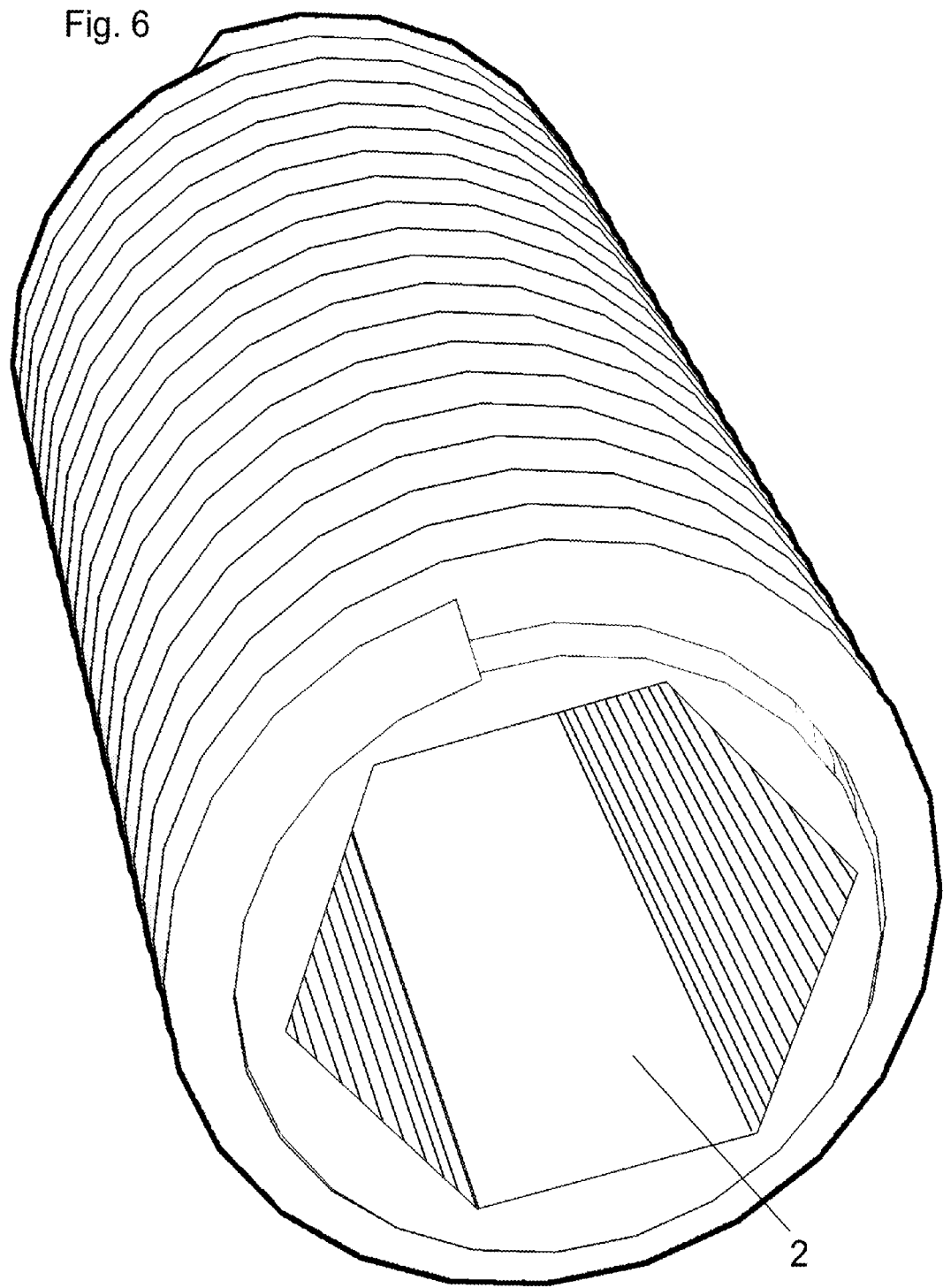
FIG. 6 shows a threaded adaptor for a threaded crank with a polygonal opening (2) for the mounting end.

In another embodiment the locking means engages the mounting end of the pedal outside of the crank. For example, as shown in FIG. 4, the locking means (9) could fit over the outboard end of the crank and engage a retainer of one or more grooves and/or indents on the mounting end that are not inside the opening. When an outside locking means is combined with a threaded adaptor of FIG. 6, a threaded crank can be used with the pedal of the instant invention. Many different configurations of lock and retainer can be used in this manner.

Several of the different elements described above can be combined in different ways to obtain different embodiments of the pedal.

In practice, the pedal of the instant invention is used in the following manner. An unlocking agent, typically a key, is engaged with the locking means and used to change the lock into the unlocked state. The mounting end of the pedal is plugged into or removed from the matching opening on the outboard end of the crank and the unlocking agent is used to change the locking means to the locked state.

Figure 5:
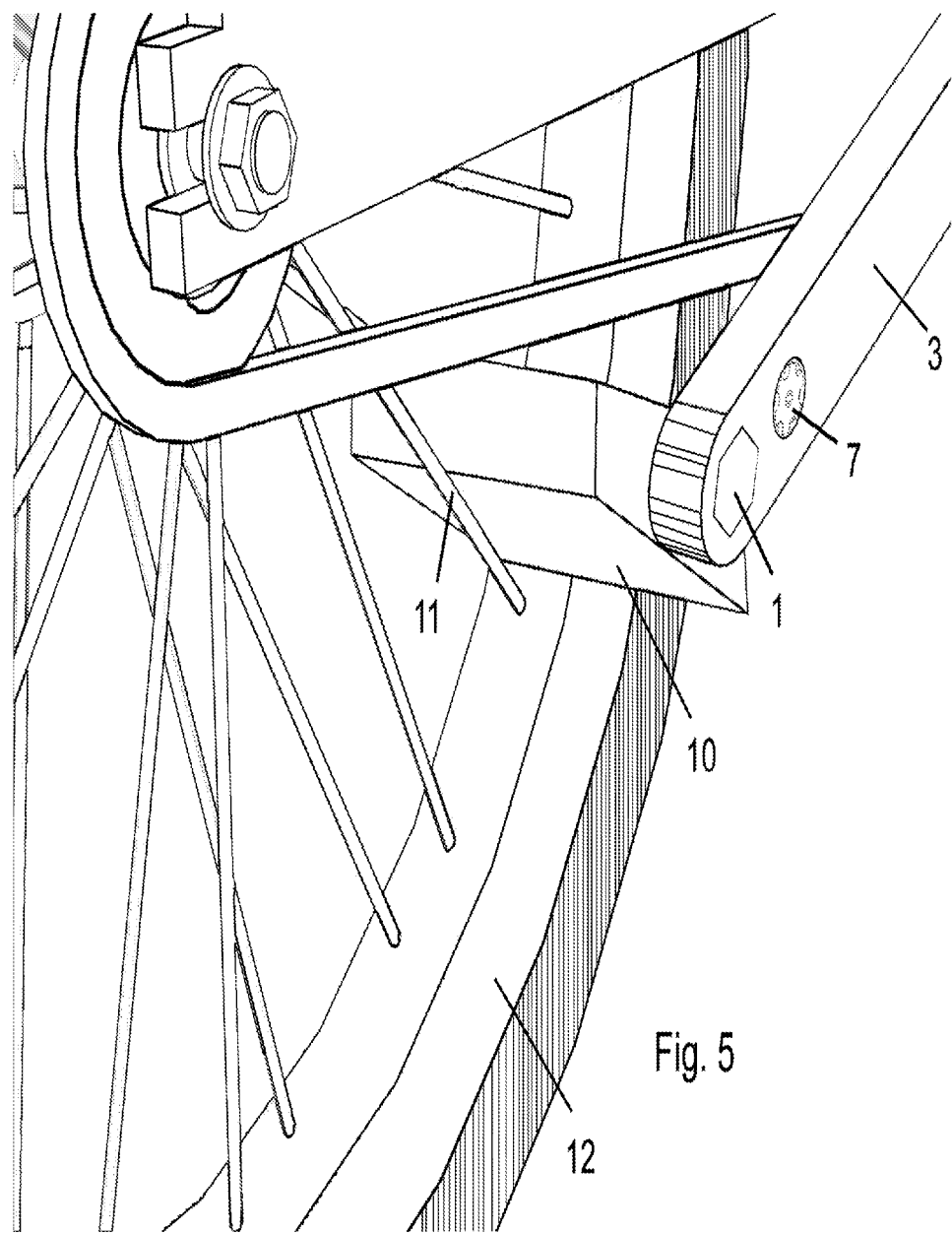
FIG. 5 shows the crank (3) with a pedal of the instant invention reversibly mounted in the crank. This figure shows how the reversibly mounted pedal base (10) can insert into the spokes (11) of the rear wheel (12).

Because the mounting end is symmetrically arranged across the thickness of the crank, the pedal can be reversibly mounted on the crank. The pedal faces outward from the bicycle frame in normal usage. The pedal faces inward, reversed, towards the bicycle frame when stored, transported, or for anti-theft reasons. On many, if not most bicycles, it will be possible to engage the inward mounted, reversed, pedal base (10) with the spokes (11) of the rear wheel (12) (FIG. 5) thereby increasing the anti-theft security as the bicycle will not roll.

When walking a bicycle along after a flat tire, it will not be desirable to stow the inward mounted pedal such that it is engaged with the spokes. The user can either mount the pedal so that the bicycle can still roll, or simply remove the pedal completely from the crank.

The instant pedals can be used in combination with any pedal driven machine such as but not limited to stationary or moving bicycles, motorized bicycles, unicycles, tricycles, quadracycles, aircraft and watercraft. The pedals can be hand or foot powered.

It is recognized that the bicycle pedal of the instant invention may require replacement of the crank with one that matches the instantly designed pedal mounting end. Alternatively, a threaded adaptor could be used to connect the pedal of this invention to an existing crank when combined with an outside mounted locking means.

It is also recognized that there will be advantages for pedal and crank set designers to agree upon a particular mounting end design to maximize interchangeability of pedals and cranks. More than one locking means or crank design will accommodate a single pedal mounting end design. It also may be desirable for high end designers to maintain control of pedal to crank connections so as to provide their own specific combination of mounting end to crank opening pattern for brand identity.

While only selected embodiments have been chosen to illustrate the present invention, it will be apparent to those skilled in the art from this disclosure that various changes and modifications can be made herein without departing from the scope or spirit of the invention as defined in the appended claims. Furthermore, the foregoing description of the embodiments according to the present invention is provided for illustration only, and not for the purpose of limiting the invention as defined by the appended claims and their equivalents.

What is claimed and desired to be secured from the United States patent is:

1. A bicycle anti-theft device comprising:
   a pedal reversibly installable in a crank;
   an opening on the outboard end of the crank;
   a pedal axle comprising a stopping means, a mounting end rotatably fixed on the crank and a mounting end engagement;
   a locking means for securing the pedal axle to the crank, the locking means being operated by a key for locking and unlocking the locking means to the mounting end, wherein the cross-section of the mounting end and the cross-section of the opening has a matching shape; said shape being selected from the group consisting of: polygonal elements, spline elements, a combination of polygonal and spline elements, and a combination of polygonal and round elements, wherein the stopping means is used to control a depth that the mounting end is inserted into the matching opening so as to align the locking means and the mounting end engagement, wherein the locking means engages the pedal mounting end symmetrically across the thickness of the crank at the mounting end engagement; and wherein, when the pedal is reversely installed in the crank, the pedal resists rotation of the crank and cannot be used to pedal the bicycle away.

2. A bicycle anti-theft device according to claim 1, wherein the mounting end and matching opening have a polygonal shape.

3. A bicycle anti-theft device according to claim 2, wherein the polygonal shape has three, four, five, six, seven, eight or more sides.

4. A bicycle anti-theft device according to claim 1, wherein the mounting end has spline elements and the matching opening has slot elements to match the spline elements.

5. A bicycle anti-theft device according to claim 1, wherein the mounting end has a combination of polygonal and spline elements and the matching opening has polygonal and slot elements.

6. A bicycle anti-theft device according to claim 1, wherein the mounting end has a combination of polygonal and round elements and the matching opening has polygonal and round elements.

7. A bicycle anti-theft device according to claim 1, wherein the mounting end engagement is selected from the group consisting of: one or more grooves, one or more indents, and combinations thereof in the mounting end.

8. A bicycle anti-theft device according to claim 1, wherein when the pedal is reversely mounted in the crank and the pedal engages the wheel spokes, the wheel is prevented from turning, and the bicycle cannot be easily wheeled away.

9. A bicycle anti-theft device according to claim 1, wherein when the pedal is reversely mounted in the crank and secured thereto with the key operated locking means, another pedal cannot be inserted into the opening of the crank.

10. A method of increasing bicycle and bicycle pedal security including the bicycle anti-theft device according to claim 1, the method comprising:

reversely inserting the pedal into a matching outboard end of the crank, locking the pedal to the crank, and securing the pedal with the key;

wherein when the pedal is locked to the crank, it can only be readily removed with the key as the unlocking agent, and wherein when the pedal is inserted into the opening of the crank reversed so as to face inward, bicycle security is itself increased.

11. A reversibly installable anti-theft bicycle pedal installed in a crank opening, the pedal comprising:

a rotation resisting mounting end on the pedal axle, the mounting end having a polygonal cross-section with three, four, five, or six sides, matching the cross-section of the crank opening, a groove orthogonal to the pedal axis and symmetrically arranged on the mounting end across a crank thickness, and a stopping means for controlling the depth of the mounting end installation in the crank, such that when the mounting end is reversely inserted into the crank opening, the groove is in alignment with a locking means, wherein, when the locking means engages the groove of the mounting end with the pedal reversely installed, the pedal resists rotation of the crank and cannot be used to pedal the bicycle away, wherein the locking means is actuated with a key for unlocking and locking the pedal mounting end to the crank in both operational and reverse positions, and wherein the reverse position is a secured position.

12. A bicycle anti-theft pedal according to claim 11, wherein when the pedal is reversely mounted in the crank and the pedal engages the wheel spokes, the wheel is prevented from turning, and the bicycle cannot be easily wheeled away.

13. A bicycle anti-theft pedal according to claim 11, wherein when the pedal is reversely mounted in the crank and secured thereto with the key operated locking means, another pedal cannot be inserted into the opening of the crank.

14. A method of increasing bicycle and bicycle pedal security including a pedal according to claim 8, the method comprising:

reversibly inserting the pedal into the matching opening on the outboard end of the crank, locking the pedal to the crank, and securing the pedal with the key;

wherein when the pedal is locked to the crank, it can only be readily removed with the key as the unlocking agent, and when the pedal is inserted into the opening of the crank reversed so as to face inward, bicycle security is itself increased.

* * * * *